No. 884,183. PATENTED APR. 7, 1908.
J. M. MARTIN.
TIMBER SAWING MACHINE.
APPLICATION FILED JULY 22, 1907.

3 SHEETS—SHEET 1.

Witnesses
C. R. Reichenbach.
John S. Powers

Inventor
J. M. Martin
By Chandler
Attorneys

No. 884,183.

PATENTED APR. 7, 1908.

J. M. MARTIN.
TIMBER SAWING MACHINE.
APPLICATION FILED JULY 22, 1907.

3 SHEETS—SHEET 3.

Witnesses
C. H. Reichenbach.
Johns Powers.

Inventor
J. M. Martin.
By
Attorneys

UNITED STATES PATENT OFFICE.

JOHN M. MARTIN, OF BYRNEVILLE, INDIANA.

TIMBER-SAWING MACHINE.

No. 884,183.　　　Specification of Letters Patent.　　　Patented April 7, 1908.

Application filed July 22, 1907. Serial No. 384,897.

*To all whom it may concern:*

Be it known that I, JOHN M. MARTIN, a citizen of the United States, residing at Byrneville, in the county of Harrison, State of Indiana, have invented certain new and useful Improvements in Timber-Sawing Machines; and I do hereby declare the following to be a full, clear, and exact description of the invention, such as will enable others skilled in the art to which it appertains to make and use the same.

This invention relates to new and useful improvements in timber sawing machines and it has more particular reference to a machine of that class in which a rotary saw is carried by a swinging frame formed for movement towards and away from the timber to be cut.

Figure 1:
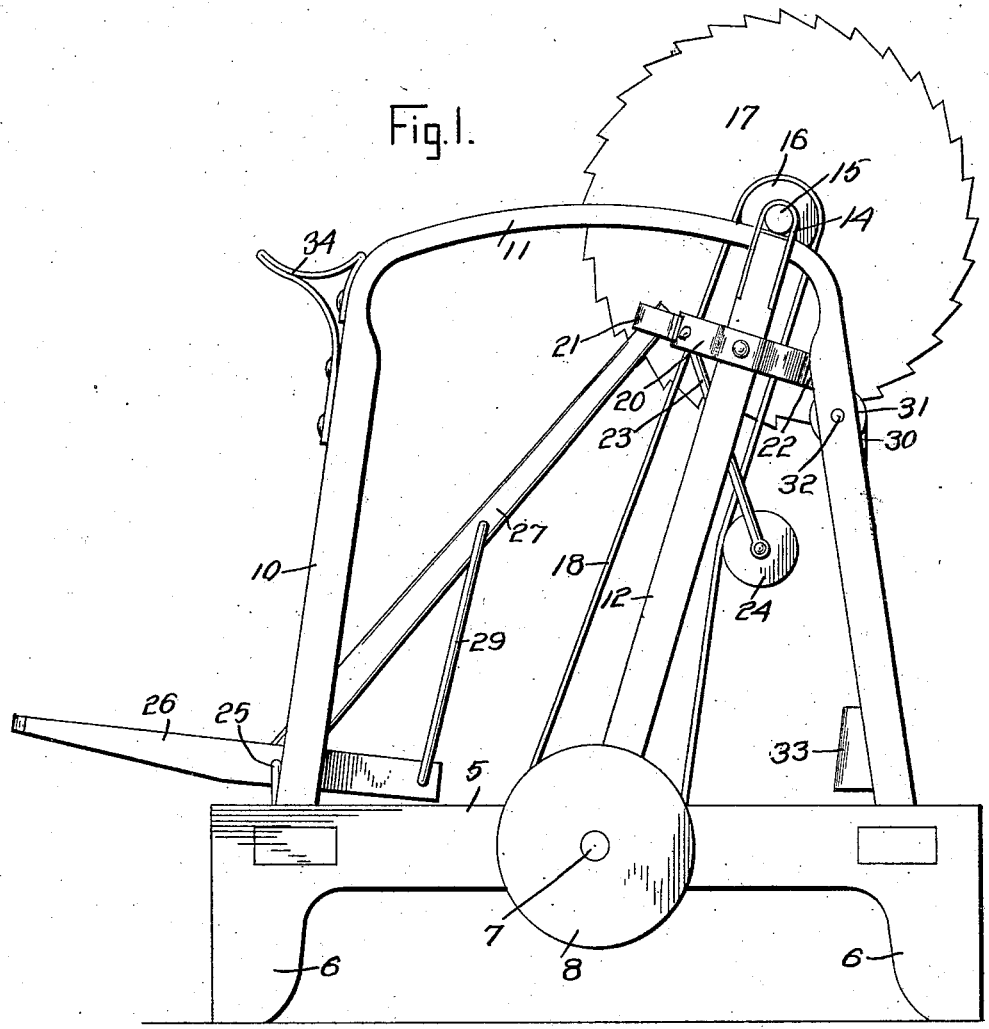
Figure 2:
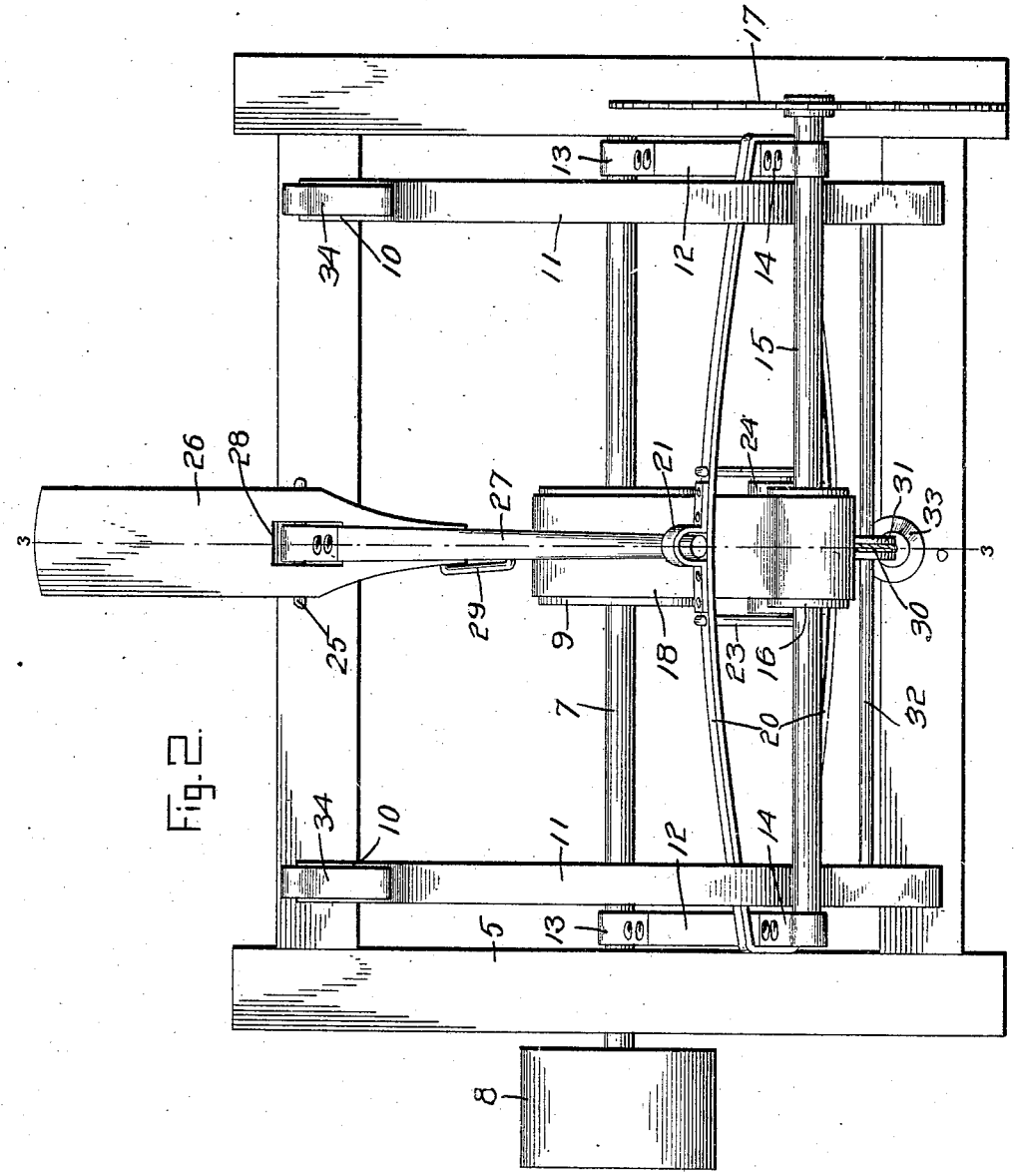
Figure 3:
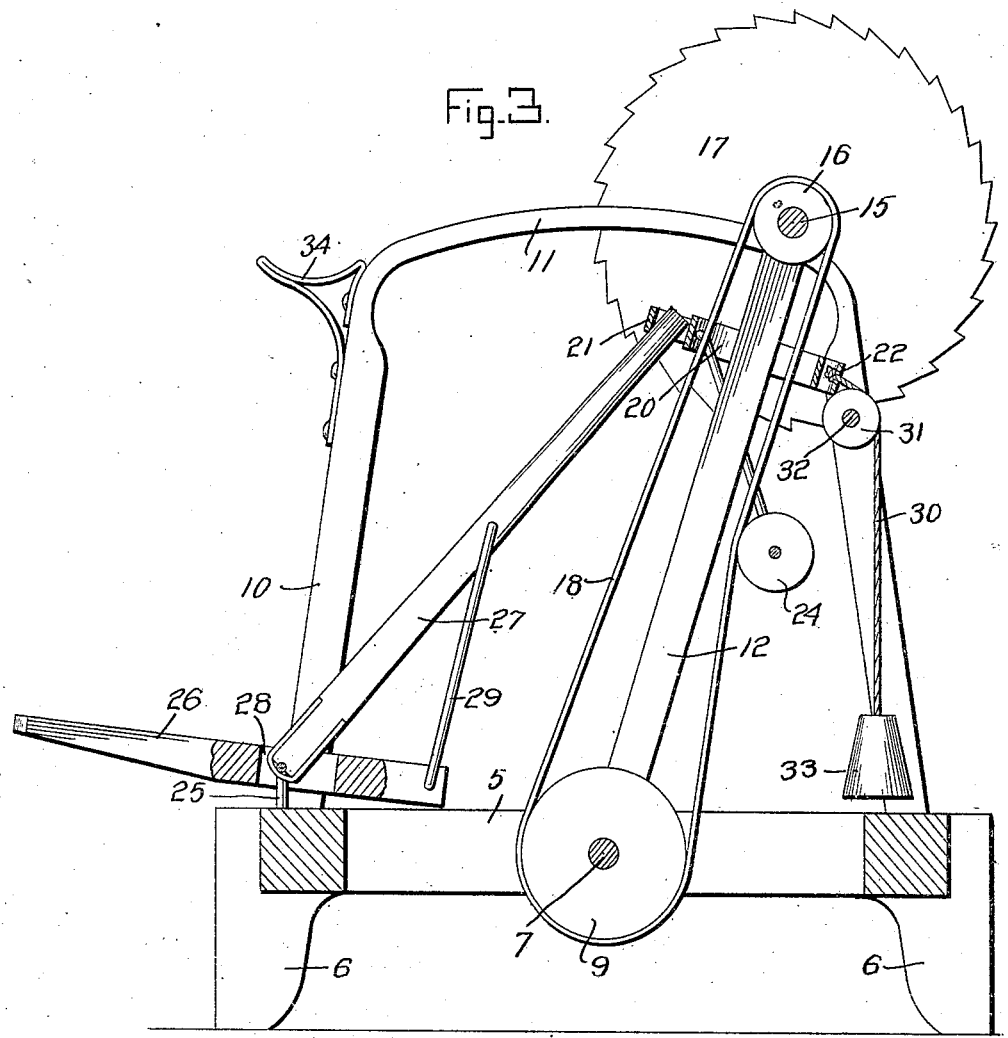

In connection with a machine of the above general type, the invention has for its object to provide a novel construction, combination and arrangement of parts, the details of which will appear in the course of the following description in which reference is had to the accompanying drawings, forming a part of this specification, like characters of reference designating similar parts, throughout the several views, wherein:

Figure 1 is a side elevation of a machine constructed in accordance with the present invention. Fig. 2 is a top plan view thereof. Fig. 3 is a central longitudinal sectional view thereof.

In the accompanying drawings, the numeral 5 designates a suitable bed or foundation which is constituted of a rectangular frame work supported upon legs 6 and having its side bars formed as bearings for a transverse shaft 7, the latter carrying beyond said bearings a belt wheel 8 for connection with any source of power supply and between said bearings a belt wheel 9. Arranged adjacent to each of the side bars of the frame 5 are arch shaped frames 10 having curved upper ends 11. Arms 12 are provided at their lower ends with clips 13, which loosely surround the shaft 7 and at their upper ends with clips 14 which loosely surround a transverse shaft 15 mounted just above the curved portions 11 and carrying a centrally located pulley 16 and at its projecting end a disk saw 17. The wheel 16 is driven from the wheel 9 by a belt 18. Surrounding the arms 12, are connected straps 20 provided with eyes or clips 21 and 22 on each side of the posts 12. Pivoted to the rearmost of the straps 20 is a U-shaped frame 23 which carries an idler pulley 24 bearing against the belt 18 and serving to take up the slack thereof. At the rear end of the frame 5, there is mounted a centrally located U-shaped member 25, the upper cross bar of which constitutes the pivot for a foot lever 26 and for a transmission lever 27, the latter extending within a slot 28 provided in the lever 26 and surrounding the cross bar of the member 25. A link 29 has one end pivoted to the inner end of the lever 26 and its other end pivoted to the lever 27 adjacent to the upper end thereof, the said upper end being projected loosely through the clip 21.

A cord 30 has its end engaged in the clip 22 beyond which said cord is trained over a grooved pulley 31 carried upon a transverse shaft 32, the latter being journaled between the adjacent bars of the frames 10. The cord 30 carries at its free end a pendent weight 33 employed for restoring the saw frame, constituted of the arms 12, to normal position, after each rearward movement thereof by the foot lever 26. The arms 10, rearwardly of the saw 17, carry brackets 34 for supporting the timber to be sawed.

The operation will be readily apparent from the foregoing description. The saw is driven from the shaft 7 through the gearing described, and depression of the foot lever 26 through the connections described, results in swinging the arms 12 rearwardly on the shaft 7 as a pivot, such swinging movement of the arms 12 moving the saw 17 to engage the timber supported on the brackets 34. When the foot lever 26 is released said arms, together with said saw, are, by virtue of the weight 33 and the connections described, moved forwardly of an approximately central point. The straps 20 serve as a means for reinforcing and strengthening the structure in addition to the other functions previously ascribed.

From the foregoing description it will be seen that simple and efficient means are provided for accomplishing the objects of the invention, but while the elements herein shown and described are well adapted to serve the functions set forth, it is obvious that various minor changes may be made in the proportions, shape and arrangement of the several parts, without departing from the spirit and scope of the invention as defined in the appended claims.

What is claimed is:

In a device of the character described, the combination of a supporting frame, a shaft journaled therein, work supporting members carried by the frame, arms loosely engaging the shaft, a shaft mounted in the arms above the work holding members, a saw carried by said shaft, a gearing connecting the two shafts, straps connecting the arms, a foot lever pivoted to the supporting frame, a lever loosely engaging one of the straps of the arms and pivotally held by the pivot of the foot lever, said foot lever having an opening to permit such engagement, a link connecting the foot lever and the second named lever so that a movement of the foot lever will impart movement to the lever, and a weighted means engaging the remaining strap of the arms.

In testimony whereof, I affix my signature, in presence of two witnesses.

JOHN M. MARTIN.

Witnesses:
MINNIE M. KRAUSGRILL,
JACIE KRAUSGRILL.